US012454262B2

(12) United States Patent
Oka et al.

(10) Patent No.: US 12,454,262 B2
(45) Date of Patent: Oct. 28, 2025

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Keisuke Oka, Wako (JP); Yohei Kitahara, Wako (JP); Yuji Kaneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 18/113,645

(22) Filed: Feb. 24, 2023

(65) Prior Publication Data

US 2023/0294680 A1 Sep. 21, 2023

(30) Foreign Application Priority Data

Mar. 18, 2022 (JP) ................. 2022-044388

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 50/16* (2013.01);
(Continued)

(58) Field of Classification Search
CPC ................. B60W 10/18; B60W 10/20; B60W 2050/143; B60W 2050/146;
(Continued)

(56) References Cited

U.S. PATENT DOCUMENTS

2009/0150034 A1 6/2009 Ezoe et al.
2012/0101701 A1* 4/2012 Moshchuk ............ B60W 30/09
701/70
(Continued)

FOREIGN PATENT DOCUMENTS

JP 2007-210591 8/2007
JP 2013-126823 6/2013
(Continued)

OTHER PUBLICATIONS

Japanese Office Action for Japanese Patent Application No. 2022-044388 mailed Jan. 9, 2024.

*Primary Examiner* — Charles J Han
(74) *Attorney, Agent, or Firm* — Amin, Turocy & Watson, LLP

(57) ABSTRACT

A driving assistance device is configured to: refer to an output of a detection device for detecting that an object is located in front of a vehicle; execute one or both of instructing a brake device of the vehicle to stop the vehicle and instructing a steering device of the vehicle to avoid a collision with the object by steering when an indicator value is less than a first threshold; execute a first preliminary operation when the indicator value is less than a second threshold; execute a second preliminary operation when the indicator value is less than a third threshold and it is determined that there is no travel path along which the vehicle is able to travel on both lateral sides of the object.

10 Claims, 7 Drawing Sheets

(51) Int. Cl.
*B60W 50/14* (2020.01)
*B60W 50/16* (2020.01)

(52) U.S. Cl.
CPC . *B60W 2050/143* (2013.01); *B60W 2050/146* (2013.01); *B60W 2554/80* (2020.02); *B60W 2710/18* (2013.01)

(58) Field of Classification Search
CPC ....... B60W 2554/80; B60W 2554/802; B60W 2554/804; B60W 2710/18; B60W 2710/20; B60W 30/085; B60W 30/09; B60W 30/0956; B60W 50/14; B60W 50/16

See application file for complete search history.

(56) References Cited

U.S. PATENT DOCUMENTS

| | | | |
|---|---|---|---|
| 2013/0211687 A1* | 8/2013 | Trost | B60T 7/22 |
| | | | 701/70 |
| 2019/0061745 A1 | 2/2019 | Hatano | |
| 2019/0092343 A1* | 3/2019 | Hoshikawa | B60W 30/08 |
| 2019/0126917 A1* | 5/2019 | You | B62D 15/0265 |
| 2020/0282983 A1 | 9/2020 | Ito et al. | |
| 2021/0188327 A1* | 6/2021 | Otliga | G01C 21/3407 |

FOREIGN PATENT DOCUMENTS

| | | |
|---|---|---|
| JP | 2017-208898 | 11/2017 |
| JP | 2020-050010 | 4/2020 |
| JP | 2020-097346 | 6/2020 |
| WO | 2017/154070 | 9/2017 |
| WO | 2019/102772 | 5/2019 |

* cited by examiner

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-044388, filed Mar. 18, 2022, the content of which is incorporated herein by reference.

BACKGROUND

Field of the Invention

The present invention relates to a driving assistance device, a driving assistance method, and a storage medium.

Description of Related Art

Recently, an invention of a vehicle control device for performing automated deceleration control and automated steering control has been disclosed (for example, see Japanese Unexamined Patent Application, First Publication No. 2020-50010).

In a vehicle capable of performing automated steering control in addition to automated deceleration control, a probability that any sudden change in a surrounding environment of a vehicle can be coped with quickly becomes high and a degree of control margin becomes relatively high. On the other hand, because automated steering control becomes difficult if there is no avoidance space on a lateral side of a target object, a degree of control margin is no different from that of a vehicle that performs only automated deceleration control. Although a process of differentiating a control operation in accordance with a situation of the avoidance space on the lateral side of the target object when automated deceleration control is performed is conceivable, it may be difficult to perform an operation corresponding to the above-described environment difference in the conventional technology.

SUMMARY

The present invention has been made in consideration of such circumstances and an objective of the present invention is to provide a driving assistance device, a driving assistance method, and a storage medium capable of performing an appropriate preliminary operation corresponding to a surrounding situation of a vehicle.

A driving assistance device, a driving assistance method, and a storage medium according to the present invention adopt the following configurations.

(1): According to an aspect of the present invention, there is provided a driving assistance device including: a storage medium storing computer-readable instructions; and at least one processor connected to the storage medium, the at least one processor executing the computer-readable instructions to: refer to an output of a detection device for detecting that an object is located in front of a vehicle; execute one or both of instructing a brake device of the vehicle to stop the vehicle and instructing a steering device of the vehicle to avoid a collision with the object by steering, when an indicator value that decreases as the vehicle approaches the object is less than a first threshold; execute a first preliminary operation when the indicator value is less than a second threshold; execute a second preliminary operation when the indicator value is less than a third threshold and it is determined, at a time point when the indicator value is less than the third threshold, that there is no travel path along which the vehicle is able to travel on both lateral sides of the object after the vehicle avoids the collision with the object by steering, wherein the first threshold is less than the second threshold and the second threshold is less than the third threshold; and change setting of the second preliminary operation in accordance with a situation in a travel path on the lateral side of the object.

(2): In the above-described aspect (1), the second preliminary operation is an operation that is started at an earlier timing than the first preliminary operation.

(3): In the above-described aspect (1), the second preliminary operation is an operation performed in more steps than the first preliminary operation.

(4): In the above-described aspect (1), at least one of the first preliminary operation and the second preliminary operation is an operation of instructing the brake device to output a braking force less than a braking force that the at least one processor instructs the brake device to output when an indicator value based on a distance between the object and the vehicle and a relative speed is less than the first threshold.

(5): In the above-described aspect (4), both the first preliminary operation and the second preliminary operation are operations of instructing the brake device to output a braking force less than a braking force that the at least one processor instructs the brake device to output when an indicator value based on a distance between the object and the vehicle and a relative speed is less than the first threshold, and a braking force initially output in the second preliminary operation is less than a braking force initially output in the first preliminary operation.

(6): In the above-described aspect (4), the second preliminary operation is an operation of increasing the braking force to be output when the indicator value indicating a degree of congestion of other vehicles in the travel path on the lateral side of the object is large as compared with when the indicator value is small (7): In the above-described aspect (1), at least one of the first preliminary operation and the second preliminary operation is an operation of instructing an output device to perform a display process, a sound output process, or a vibration output process as an alert.

(8): In the above-described aspect (1), the second preliminary operation is an operation of instructing an output device to perform a display process, a sound output process, or a vibration output process as an alert at an earlier timing when the indicator value indicating a degree of congestion of other vehicles in the travel path on the lateral side of the object is large than when the indicator value is small.

(9): According to another aspect of the present invention, there is provided a driving assistance method including: referring, by a driving assistance device, to an output of a detection device for detecting that an object is located in front of a vehicle; executing, by the driving assistance device, one or both of instructing a brake device of the vehicle to stop the vehicle and instructing a steering device of the vehicle to avoid a collision with the object by steering, when an indicator value that decreases as the vehicle approaches the object is less than a first threshold; executing, by the driving assistance device, a first preliminary operation when the indicator value is less than a second threshold; executing, by the driving assistance device, a second preliminary operation when the indicator value is less than a third threshold and it is determined, at a time point when the indicator value is less than the third threshold, that there is no travel path along which the vehicle is able to travel on both lateral sides of the object after the vehicle avoids the collision with the object by steering, wherein the first threshold is less than the second threshold and the second threshold is less than the third threshold; and changing, by the driving assistance device, setting of the second preliminary operation in accordance with a situation in a travel path on the lateral side of the object.

(10): According to still another aspect of the present invention, there is provided a computer-readable non-transitory storage medium storing a program for causing a computer to: refer to an output of a detection device for detecting that an object is located in front of a vehicle; execute one or both of instructing a brake device of the vehicle to stop the vehicle and instructing a steering device of the vehicle to avoid a collision with the object by steering, when an indicator value that decreases as the vehicle approaches the object is less than a first threshold; execute a first preliminary operation when the indicator value is less than a second threshold; execute a second preliminary operation when the indicator value is less than a third threshold and it is determined, at a time point when the indicator value is less than the third threshold, that there is no travel path along which the vehicle is able to travel on both lateral sides of the object after the vehicle avoids the collision with the object by steering, wherein the first threshold is less than the second threshold and the second threshold is less than the third threshold; and change setting of the second preliminary operation in accordance with a situation in a travel path on the lateral side of the object.

According to the aspects (1) to (10), it is possible to perform an appropriate preliminary operation corresponding to a surrounding situation of a vehicle.

DESCRIPTION OF EMBODIMENTS

Hereinafter, embodiments of a driving assistance device, a driving assistance method, and a storage medium according to the present invention will be described with reference to the drawings.

[Overall Configuration]

Figure 1:
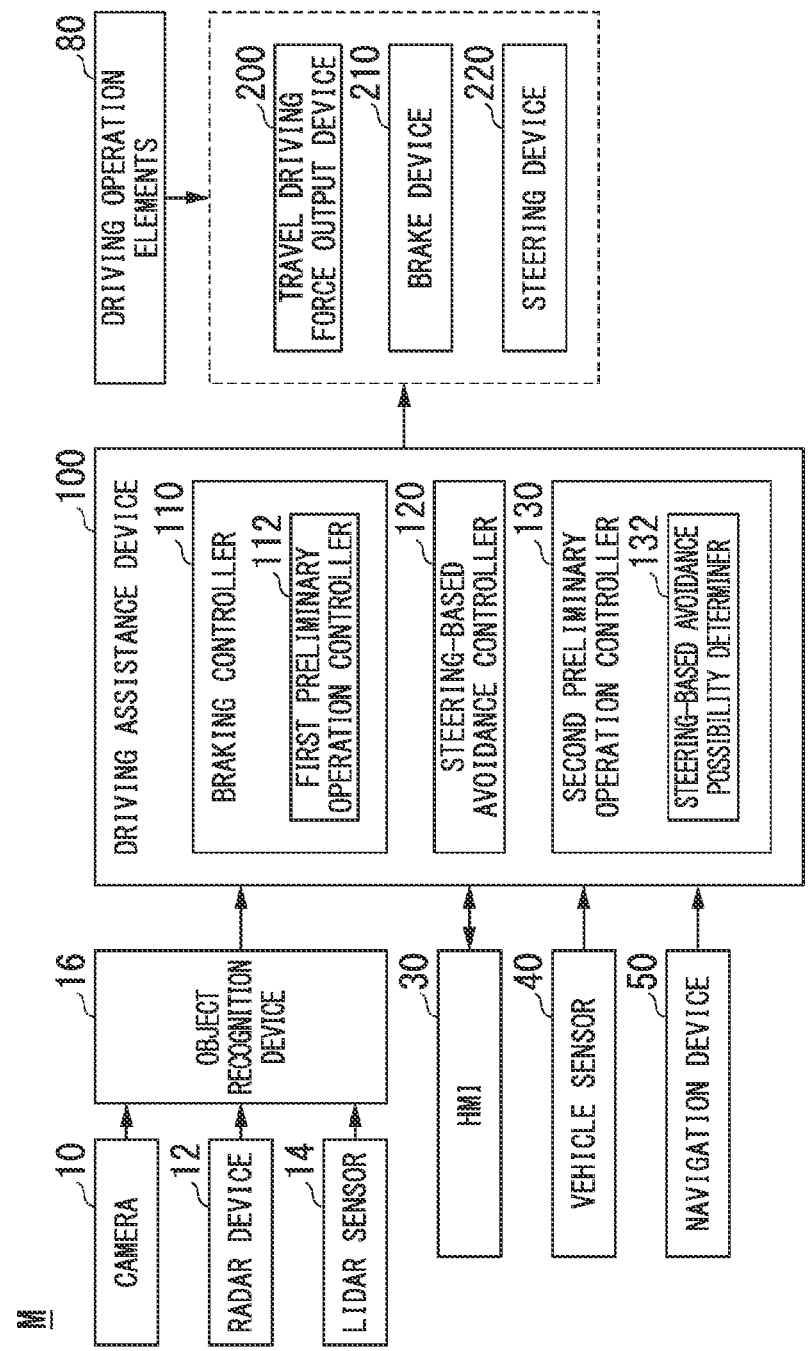
FIG. 1 is a configuration diagram of a vehicle in which a driving assistance device of an embodiment is mounted.

FIG. 1 is a configuration diagram of a vehicle M in which a driving assistance device 100 of an embodiment is mounted. The vehicle M is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power that is supplied when a secondary battery or a fuel cell is discharged.

For example, the vehicle M includes a camera 10, a radar device 12, a light detection and ranging (LIDAR) sensor 14, an object recognition device 16, a human machine interface (HMI) 30, a vehicle sensor 40, a navigation device 50, driving operation elements 80, a driving assistance device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge-coupled device (CCD) or a complementary metal oxide semiconductor (CMOS). The camera 10 is attached to any location on the vehicle (hereinafter, the vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of an object by detecting radio waves (reflected waves) reflected by the object. The radar device 12 is attached to any location on the vehicle M. The radar device 12 may detect a position and speed of the object in a frequency modulated continuous wave (FM-CW) scheme.

The LIDAR sensor 14 radiates light (or electromagnetic waves of a wavelength close to an optical wavelength) to the vicinity of the vehicle M and measures scattered light. The LIDAR sensor 14 detects a distance to an object on the basis of a time period from light emission to light reception. The radiated light is, for example, pulsed laser light. The LIDAR sensor 14 is attached to any location on the vehicle M.

The object recognition device 16 performs a sensor fusion process for detection results from some or all of the camera 10, the radar device 12, and the LIDAR sensor 14 to recognize a position, a type, a speed, and the like of an object. The object recognition device 16 outputs recognition results to the driving assistance device 100. The object recognition device 16 may output detection results of the camera 10, the radar device 12, and the LIDAR sensor 14 to the driving assistance device 100 as they are. The object recognition device 16 may be omitted from the vehicle system 1. Some or all of the camera 10, the radar device 12, the LIDAR sensor 14, and the object recognition device 16 are an example of a "detection device."

The HMI 30 provides an occupant of the vehicle M with various types of information and receives an input operation from the occupant. The HMI 30 includes various types of display devices, a speaker, a vibration generation device (a vibrator), a buzzer, a touch panel, a switch, a key, and the like.

The vehicle sensor 40 includes a vehicle speed sensor configured to detect the speed of the vehicle M, an acceleration sensor configured to detect acceleration, a yaw rate sensor configured to detect an angular speed around a vertical axis, a direction sensor configured to detect a direction of the vehicle M, and the like.

The navigation device 50 has, for example, a global navigation satellite system (GNSS) receiver, a guidance controller, a storage storing map information, and the like. The GNSS receiver identifies a position of the vehicle M on the basis of signals received from GNSS satellites. A position of the vehicle M may be identified or corrected by an inertial navigation system (INS) using an output of the vehicle sensor 40. For example, the guidance controller decides on a route from the position of the vehicle M identified by the GNSS receiver (or any input position) to a destination input by the occupant with reference to the map information and causes the HMI 30 to output guidance information so that the vehicle M travels along a path. The map information is, for example, information in which a road shape is expressed by a link indicating a road and nodes connected by the link. The map information may include the curvature of a road, point of interest (POI) information, and the like. The navigation device 50 may transmit a current position and a destination of the vehicle M to a navigation server via the communication device and acquire a route from the navigation server.

The driving operation element 80 includes, for example, an accelerator pedal, a brake pedal, a steering wheel, a shift lever, and other operation elements. A sensor for detecting an operation amount or the presence or absence of an operation is attached to the driving operation element 80 and a detection result thereof is output to some or all of the travel driving force output device 200, the brake device 210, and the steering device 220.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the driving assistance device 100 or information input from the driving operation element 80.

For example, the brake device 210 includes a brake caliper, a cylinder configured to transfer hydraulic pressure to the brake caliper, an electric motor configured to generate hydraulic pressure in the cylinder, and an ECU. The ECU controls the electric motor in accordance with the information input from the driving assistance device 100 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. The brake device 210 is not limited to the above-described configuration and may be an electronically controlled hydraulic brake device configured to control an actuator in accordance with information input from the driving assistance device 100 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the driving assistance device 100 or the information input from the driving operation element 80 to change the direction of the steerable wheels.

[Driving Assistance Device]

The driving assistance device 100 includes, for example, a braking controller 110, a steering-based avoidance controller 120, and a second preliminary operation controller 130. The braking controller 110 includes a first preliminary operation controller 112 and the second preliminary operation controller 130 includes a steering-based avoidance possibility determiner 132. Each of these functional components is implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as a hard disk drive (HDD) or a flash memory of the driving assistance device 100 or may be stored in a removable storage medium such as a digital video disc (DVD) or a compact disc (CD)-read-only memory (ROM) and installed in the HDD or the flash memory of the driving assistance device 100 when the storage medium (the non-transitory storage medium) is mounted in a drive device.

Setting is performed inside of the travel driving force output device 200, the brake device 210, and the steering device 220 so that instructions from the driving assistance device 100 to the travel driving force output device 200, the brake device 210, and the steering device 220 are issued with preference over a detection result from the driving operation element 80. Also, in relation to braking, if a braking force based on an operation amount of the brake pedal is larger than that in the instruction from the driving assistance device 100, setting may be performed so that the braking operation is preferentially executed. Also, as a mechanism for preferentially issuing an instruction from the driving assistance device 100, the communication priority in the in-vehicle LAN may be used.

Figure 2:
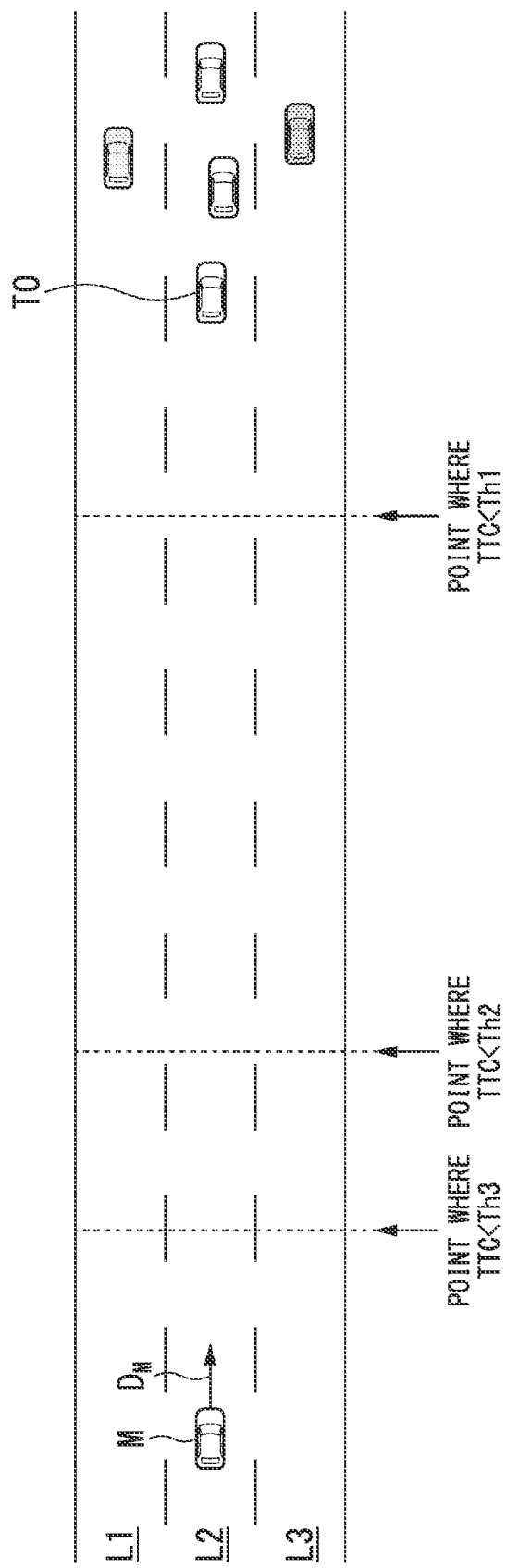
FIG. 2 is a diagram showing an overview of a function of the driving assistance device.

FIG. 2 is a diagram showing an overview of a function of the driving assistance device 100. Hereinafter, each part of the driving assistance device 100 will be described with reference to FIG. 2 and FIG. 1. In FIG. 2, the vehicle M is traveling on a three-lane road and is in a lane L2 in the center thereof. $D_M$ denotes a traveling direction of the vehicle M.

The braking controller 110 instructs the brake device 210 and/or the travel driving force output device 200 to decelerate and stop the vehicle M when a degree of proximity between a target object TO among objects and the vehicle M satisfies a first condition with reference to an output of the detection device (described above) that detects that an object is located in front of the vehicle M. The target object TO is an object located on the same travel path as the vehicle M and on the traveling direction side of the vehicle M and is an object with which the vehicle M should avoid a collision, rather than objects that the vehicle M can pass over such as manholes. The braking controller 110 extracts such an object and sets the extracted object as the target object TO. In the example of FIG. 2, another vehicle at the rear end of the conventional example is set as the target object TO. The travel path is, for example, a lane, but may be a virtual lane virtually set by the vehicle M on a road surface on which there is no road marking. The same is also true for the following description.

The "degree of proximity" is represented by various types of indicator values that indicate the degree of proximity between objects. For example, the "degree of proximity" is time to collision (TTC), which is an indicator value obtained by dividing a distance by a relative speed (positive in a direction in which objects approach each other). Also, when the relative speed is negative (in a direction in which objects move away from each other), the TTC is provisionally set to infinity. The TTC is an indicator value indicating that the "degree of proximity" increases as the value decreases. The fact that the "first condition" is satisfied indicates, for example, that the TTC is less than a first threshold Th1. The first threshold Th1 is, for example, a value of about 1.1 to 1.9 [sec]. Instead of the TTC, an indicator value having a similar property thereto, for example, a headway time, a distance, or another indicator value, may be used as the "degree of proximity" Also, the TTC adjusted in consideration of acceleration and jerk may be used as the "degree of proximity" In the following description, it is assumed that the "degree of proximity" is the TTC.

When the TTC is less than the first threshold Th1, for example, the braking controller 110 instructs the brake device 210 and/or the travel driving force output device 200 to output a braking force for decelerating the vehicle M at first deceleration B1. The first deceleration B1 is, for example, a deceleration of about 0.1 to 0.9 [G] (close to 1). Thereby, the braking controller 110 causes the vehicle M to quickly decelerate and stop and avoids a collision with the target object TO. The ECU of the brake device 210 or the travel driving force output device 200 has a function of obtaining a brake output, a regeneration control amount, an engine brake amount, or the like from instruction-specific deceleration. The ECU decides on each control amount on the basis of the instruction-specific deceleration and the speed of the vehicle M. This is well-known technology and detailed description thereof will be omitted.

The operation of the first preliminary operation controller 112 will be described below and the steering-based avoidance controller 120 will be described first.

Figure 3:
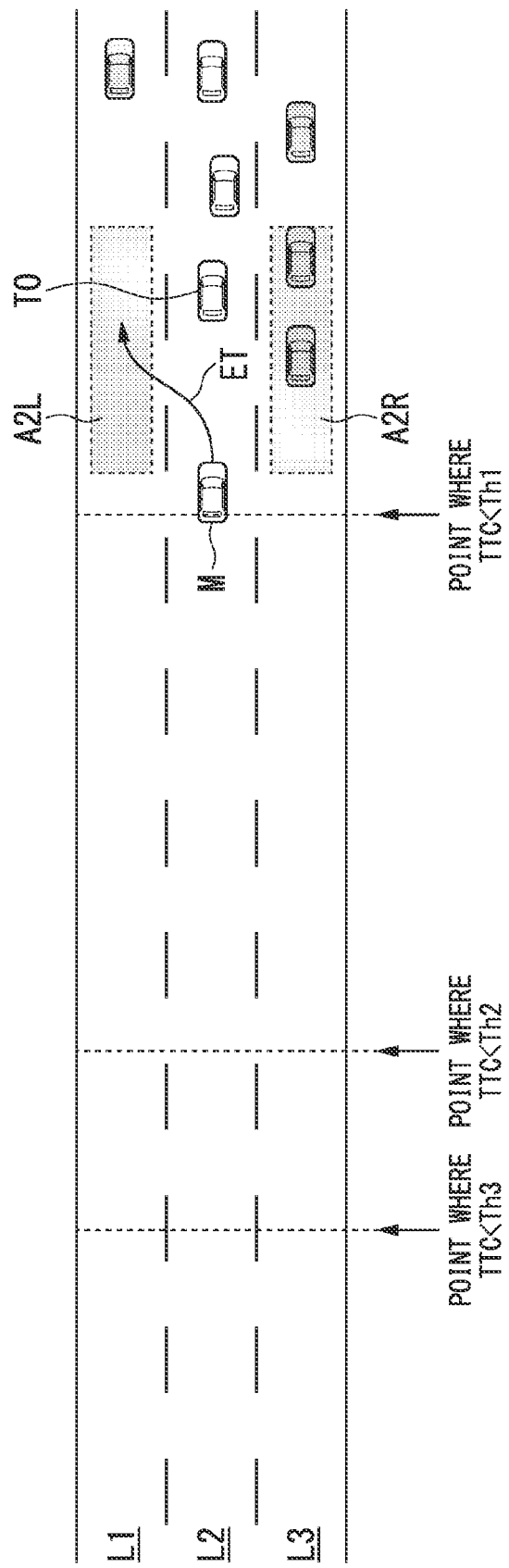
FIG. 3 is a diagram showing an example of an operation scene of a steering-based avoidance controller.

FIG. 3 is a diagram showing an example of an operation scene of the steering-based avoidance controller 120. The steering-based avoidance controller 120 determines whether or not there is a space where the vehicle M is able to travel in a travel path (for example, a lane L1 or L2) on a lateral side of the target object TO when it is determined that it is difficult for the braking controller 110 to stop the vehicle M in front of the target object TO, generates an avoidance trajectory ET when it is determined that there is a space, and issues an instruction to the steering device 220 so that the vehicle M travels along the avoidance trajectory ET (steering-based avoidance). For example, the steering-based avoidance controller 120 determines whether or not an object is located in lateral side areas extending slightly in front of and behind the target vehicle on both lateral sides of the target vehicle TO, such as areas A2L and A2R shown in FIG. 3, and determines that there is a space where the vehicle M is able to travel in a travel path on a lateral side of the target object TO when there is no object. The determination of whether or not it is difficult for the braking controller 110 to stop the vehicle M in front of the target object TO may be made by the braking controller 110, or may be made by the steering-based avoidance controller 120. The steering-based avoidance controller 120 may also recognize a boundary of a travel path by, for example, recognizing a white line or a road shoulder of a camera image, and determine that an object is located in an area when neither of the available travel areas A2L and A2R is present, for example, when neither of the lanes L1 and L3 is present.

Steering-based avoidance is performed in a situation in which a sudden change in the surrounding environment of the vehicle has occurred such as a situation in which a target object TO decelerates unexpectedly or an object different from a recognized target object TO intervenes between the vehicle M and the target object TO and is set as a new target vehicle TO. In this situation, there is a possibility that a countermeasure cannot be taken at deceleration calculated in advance so that the vehicle stops in front of the target vehicle TO, but it is possible to increase a probability that sudden changes in the surrounding environment of the vehicle can be coped with by providing a steering-based avoidance function.

[Preliminary Operation]

Figure 4:
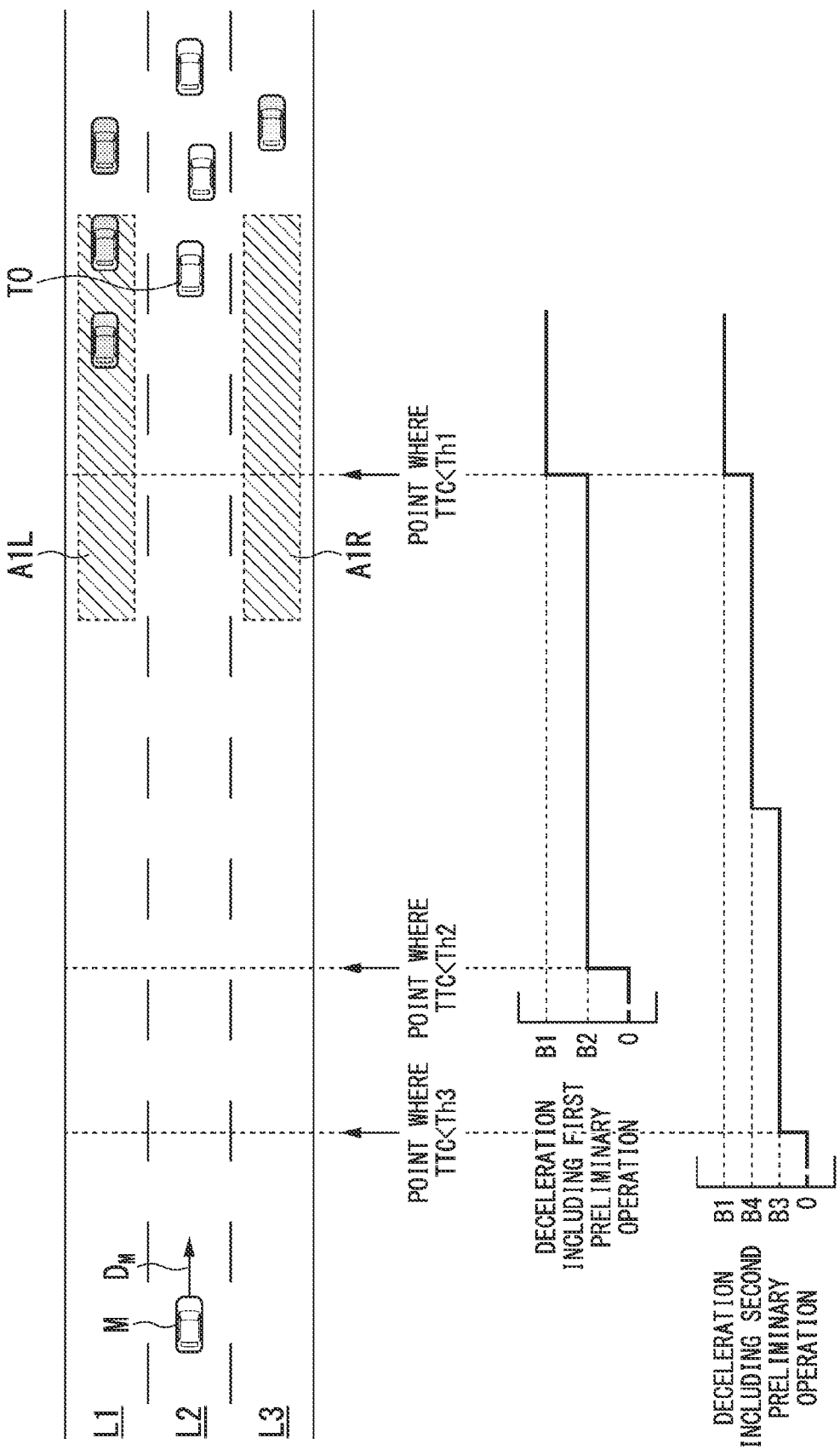
FIG. 4 is a diagram for describing a preliminary operation.

The processes of the first preliminary operation controller 112 and the second preliminary operation controller 130 will be described below. FIG. 4 is a diagram for describing a preliminary operation.

When a degree of proximity between a target object TO and the vehicle M satisfies a second condition (for example, when the TTC is less than a second threshold Th2), the first preliminary operation controller 112 performs a first preliminary operation for notifying a driver of the vehicle M of the presence of the target object TO. The first preliminary operation is, for example, an operation of instructing the brake device 210 and/or the travel driving force output device 200 to output a braking force for decelerating the vehicle M at second deceleration B2 from the time when the TTC is less than the second threshold Th2 to the time when the TTC is less than the first threshold Th1. The second deceleration B2 is deceleration less than the first deceleration B1 (or close to zero). The second threshold Th2 is a value larger than the first threshold Th1. Accordingly, the first condition is a condition that is satisfied when the degree of proximity is higher than that of the second condition.

When it is determined that the degree of proximity between the target object TO and the vehicle M satisfies a third condition (for example, the TTC is less than a third threshold Th3) and there is no available travel space in both travel paths on lateral sides of the target object TO after the vehicle M avoids a collision with the target object TO by steering at the time point when the third condition is satisfied, the second preliminary operation controller 130 performs a second preliminary operation of notifying the driver of the vehicle M of the presence of the target object TO. A determination related to the available travel space is made by the steering-based avoidance possibility determiner 132. The third threshold Th3 is a value larger than the second threshold Th2. Accordingly, the second condition is a condition that is satisfied when the degree of proximity is higher than that of the third condition.

For example, the steering-based avoidance possibility determiner 132 determines whether or not an object is located within lateral side areas extending slightly in front of and behind the target vehicle on both lateral sides of the target vehicle TO, such as areas A1L and A1R shown in FIG. 4, for example, at a time point when the TTC is less than the third threshold Th3, and determines that there is a space where the vehicle M is able to travel in a travel path on the lateral side of the target object TO when there is no object.

The areas A1L and A1R is set to be larger than the areas A2L and A2R, respectively, for example, in consideration of future uncertain factors. Like the steering-based avoidance controller 120, the steering-based avoidance possibility determiner 132 may also recognize the boundary of the travel path by recognizing a white line and a road shoulder in a camera image and determine that an object is located in the area when neither of the available travel areas A1L and A1R is present, for example, when neither of the lanes L1 and L3 is present. In the example of FIG. 4, because there is no object in the area A1R, the steering-based avoidance possibility determiner 132 determines that there is a space where the vehicle M is able to travel in a travel path on the lateral side of the target object TO.

The second preliminary operation is, for example, an operation of instructing the brake device 210 and/or the travel driving force output device 200 to output a braking force for decelerating the vehicle M at third deceleration B3 from the time when the TTC is less than the third threshold Th3 to the time when the TTC is less than the first threshold Th1 and subsequently instructing the brake device 210 and/or the travel driving force output device 200 to output a braking force for decelerating the vehicle M at fourth deceleration B4. The third deceleration B3 is, for example, deceleration less than the second deceleration B2 (or close to zero), and the fourth deceleration B4 is deceleration greater than or substantially equal to the second deceleration and less than the first deceleration B1. A timing when the deceleration is switched from the third deceleration B3 to the fourth deceleration B4 may be set arbitrarily.

Thus, a start timing of the second preliminary operation is earlier than that of the first preliminary operation and the second preliminary operation is performed in multiple steps. As described above, in a situation in which steering-based avoidance is possible, a probability that any sudden change in the surrounding environment of the vehicle can be coped with quickly becomes high and a degree of control margin becomes relatively high. On the other hand, because it is difficult to execute a steering-based avoidance function even if the steering-based avoidance function is provided when there is no avoidance space on the lateral side of the target object, a degree of control margin is no different from that of a vehicle that performs only an automated stop operation. That is, it is preferable to warn the driver of the vehicle M more quickly and effectively in a situation in which steering-based avoidance is difficult than in a situation in which steering-based avoidance is possible. According to the present embodiment, a start timing of the second preliminary operation is earlier than that of the first preliminary operation and the second preliminary operation is performed in multiple steps, and therefore it is possible to perform an appropriate preliminary operation corresponding to the surrounding situation of the target object.

In the above-described embodiment, in either of the first preliminary operation and the second preliminary operation, a display process, a sound output process, or a vibration output process or the like may be performed as an alert instead of the output of the braking force. In this case, as an example in which the second preliminary operation is performed in multiple steps, instead of outputting the braking force stepwise while changing the degree of deceleration as described above, a process of differentiating a degree of attention (contrast, brightness, color, or the like) between an initial display screen and second and subsequent display screens, a process of differentiating content or a volume between an initial sound output and second and subsequent sound outputs, a process of increasing second and subsequent vibration outputs as compared with the first vibration output, or the like may be provided.

Thus, although the second preliminary operation is executed at an earlier timing than the first preliminary operation due to the fact that there is no space where the vehicle M is able to travel in a travel path on the lateral side of the target object TO, it is preferable to change the setting (profile) of the second preliminary operation to be executed in accordance with a situation of the space. For example, when a plurality of other vehicles are in a state of complete traffic jam (i.e., a speed of zero) in the travel path on the lateral side of the target object TO, the need for the vehicle M to stop in front of the target object TO becomes high. On the other hand, when the number of other vehicles located in the space in the travel path on the lateral side of the target object TO is smaller or when the other vehicles are moving forward, the need for the vehicle M to stop in front of the target object TO is lower.

Figure 5:
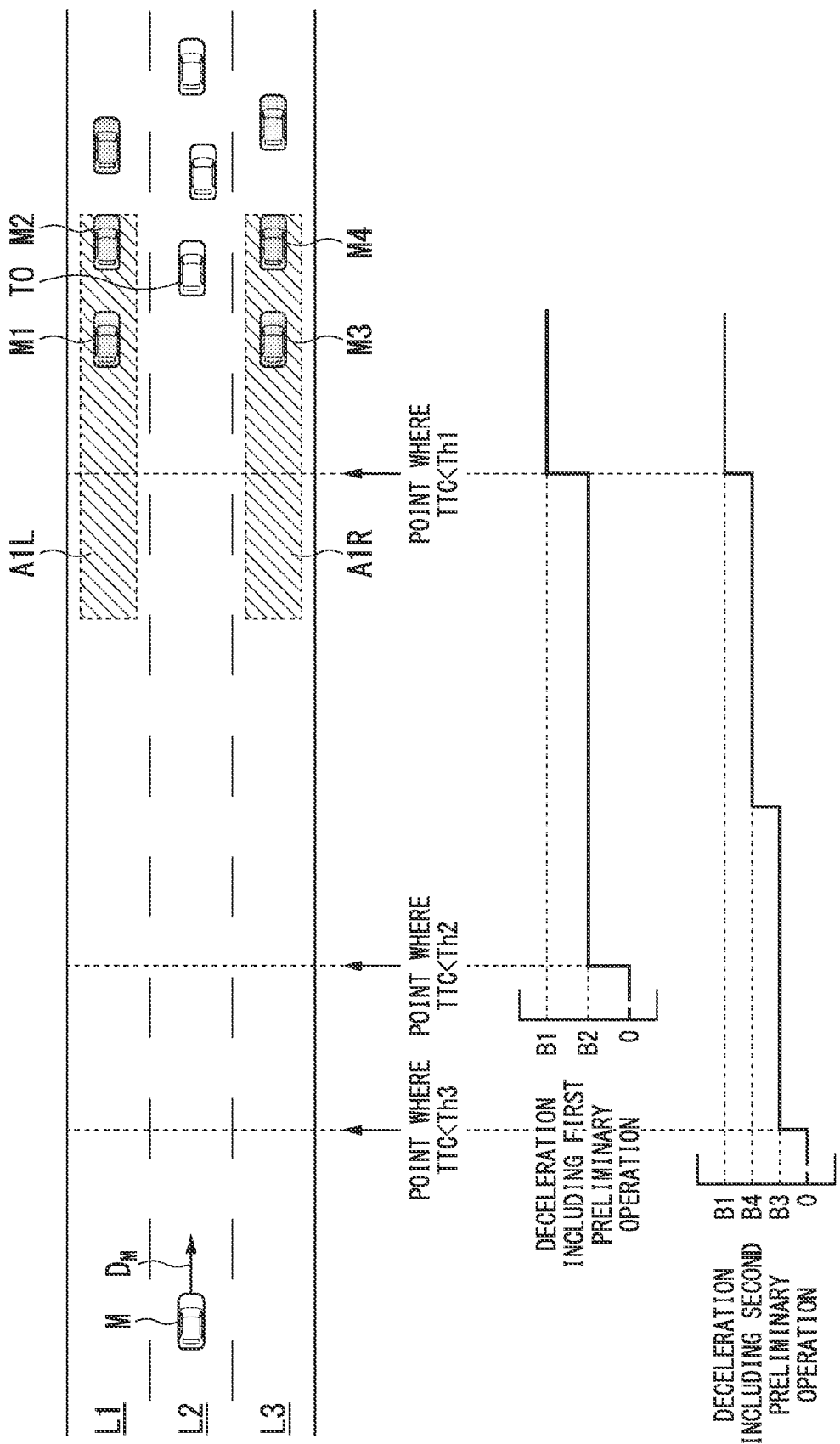
FIG. 5 is a diagram for describing a method of changing the setting of an operation of a second preliminary operation controller in accordance with a situation in a travel path on a lateral side of a target object.

With situations like these as a background, the second preliminary operation controller 130 changes the setting of the second preliminary operation to be executed in accordance with a situation in the travel path on the lateral side of the target object TO, more specifically, an indicator value indicating a degree of congestion of other vehicles in the travel path on the lateral side of the target object TO. FIG. 5 is a diagram for describing a method of changing the setting of an operation of the second preliminary operation controller in accordance with the situation in the travel path on the lateral side of the target object. FIG. 5 shows a situation where another vehicle M1 and another vehicle M2 are located in an area A1L and another vehicle M3 and another vehicle M4 are located in an area A1R as an example. Here, it is assumed that the other vehicle M1, the other vehicle M2, the other vehicle M3, and the other vehicle M4 are in a stopped state (i.e., their speeds are zero).

For example, the second preliminary operation controller 130 calculates the number of other vehicles located in a prescribed area of the travel path on the lateral side (i.e., the area A1L and the area A1R in FIG. 5) as an indicator value indicating the degree of congestion of other vehicles in the travel path on the lateral side of the target object TO. The second preliminary operation controller 130 further increases the output of a braking force in the second preliminary operation when the number of other vehicles located in the prescribed area is larger than when the number of other vehicles is smaller. Also, the second preliminary operation controller 130 instructs the HMI 30 to perform a display process, a sound output process, or a vibration output process as an alert at an earlier timing when the number of other vehicles located in the prescribed area is larger than when the number of other vehicles is smaller. At this time, the second preliminary operation controller 130 may instruct the HMI 30 to output higher-visibility display, higher-volume sound, or stronger vibration. Also, the second preliminary operation controller 130 may calculate a ratio of an area of other vehicles to a prescribed area of the travel path on the lateral side of the target object TO instead of the number of other vehicles and use the calculated ratio as an indicator value.

Figure 6:
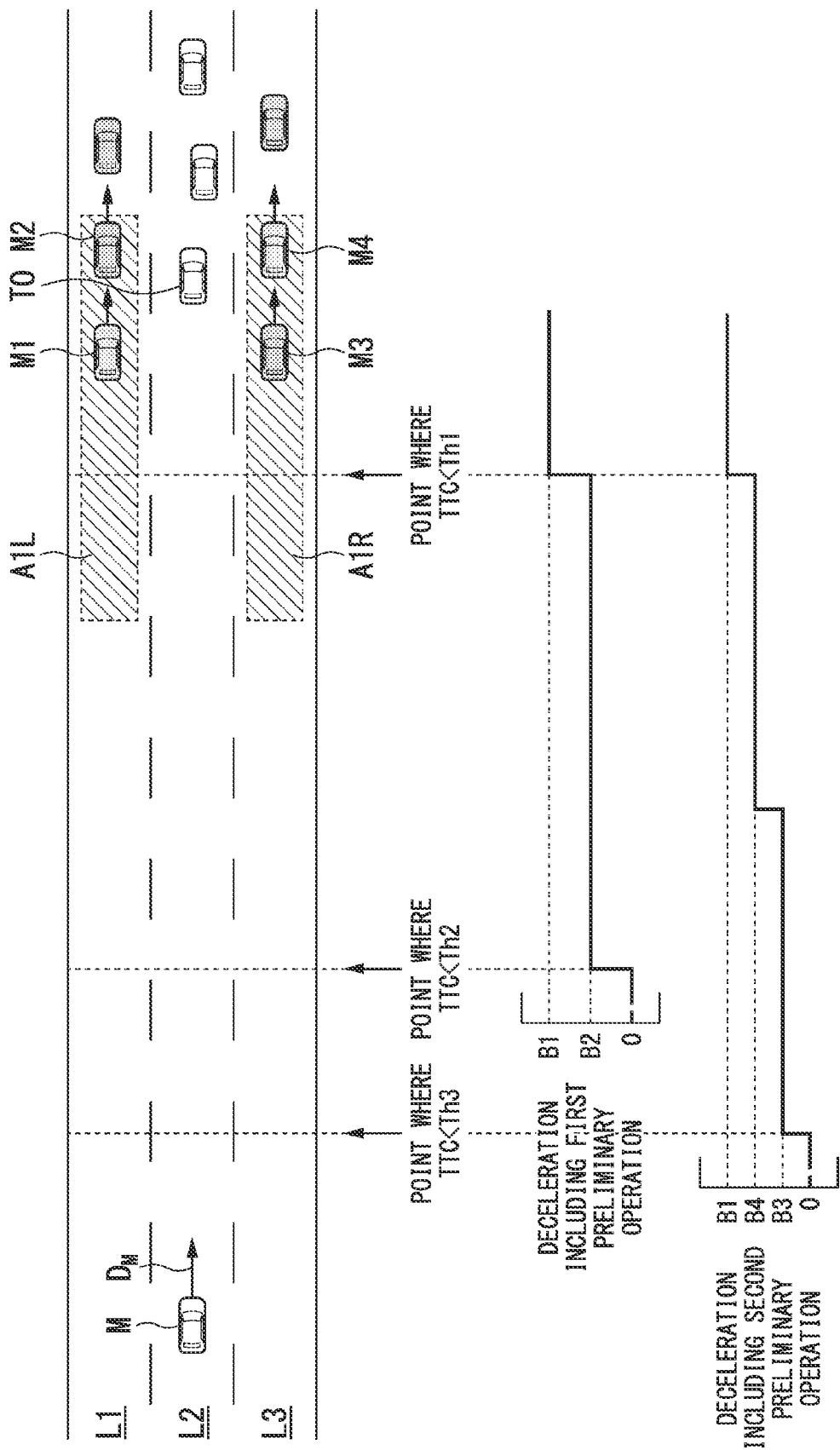
FIG. 6 is another diagram for describing a method of changing the setting of an operation of the second preliminary operation controller in accordance with a situation in a travel path on a lateral side of a target object.

FIG. 6 is another diagram for describing a method of changing the setting of the operation of the second preliminary operation controller in accordance with a situation in the travel path on the lateral side of the target object. FIG. 6 shows a scene in which another vehicle M1 and another vehicle M2 are located in an area A1L and another vehicle M3 and another vehicle M4 are located in an area A1R like FIG. 5. However, it is assumed that the other vehicle M1, the other vehicle M2, the other vehicle M3, and the other vehicle M4 are in a traveling state (i.e., their speeds are positive) in FIG. 6 unlike FIG. 5.

For example, the second preliminary operation controller 130 calculates the speed of another vehicle (an absolute speed or a relative speed based on the host vehicle) located in the prescribed area of the travel path on the lateral side (i.e., the area A1L and the area A1R in FIG. 5) as an indicator value indicating the degree of congestion of other vehicles in the travel path on the lateral side of the target object TO. In calculating the speed of the other vehicle, for example, the detection result of the object recognition device 16 described above can be used. The second preliminary operation controller 130 increases the output of the braking force in the second preliminary operation as the speed of the other vehicle located in a prescribed area (for example, an average speed when there are a plurality of other vehicles) decreases as compared with a case where the speed of the other vehicle is high. Also, the second preliminary operation controller 130 instructs the HMI 30 to perform a display process, a sound output process, or a vibration output process as an alert at an earlier timing when the speed of the other vehicle located in the prescribed area is lower than when the speed of the other vehicle is higher. At this time, the second preliminary operation controller 130 may instruct the HMI 30 to output higher-visibility display, higher-volume sound, or stronger vibration. Thereby, the second preliminary operation controller 130 can perform a more appropriate second preliminary operation in accordance with the high need to stop in front of the target object TO.

Although an example in which the second preliminary operation controller 130 calculates the number and speeds of other vehicles located in the prescribed area of the travel path on the lateral side of the target object TO as an indicator value has been described above, the second preliminary operation controller 130 may perform a weighting process for a plurality of calculated indicator values and change the setting of the second preliminary operation as an integrated indicator value.

Furthermore, as another example, for example, the second preliminary operation controller 130 may set a threshold for each of the number and speeds of other vehicles located in a prescribed area of the travel path on the lateral side of the target object TO and change the setting of the second preliminary operation to be executed in accordance with whether or not the calculated number and/or speeds of other vehicles are greater than or equal to the threshold. For example, the second preliminary operation controller 130 may increase the output of the braking force in the second preliminary operation when the number of other vehicles present in the prescribed area of the travel path on the lateral side of the target object TO is greater than or equal to the threshold (for example, 4). Also, for example, when the speed of the other vehicle located in the prescribed area of the travel path on the lateral side of the target object TO is less than or equal to the threshold (for example, 3 km per hour), the second preliminary operation controller 130 may increase the output of the braking force in the second preliminary operation. These conditions may be combined with each other as AND conditions.

Figure 7:
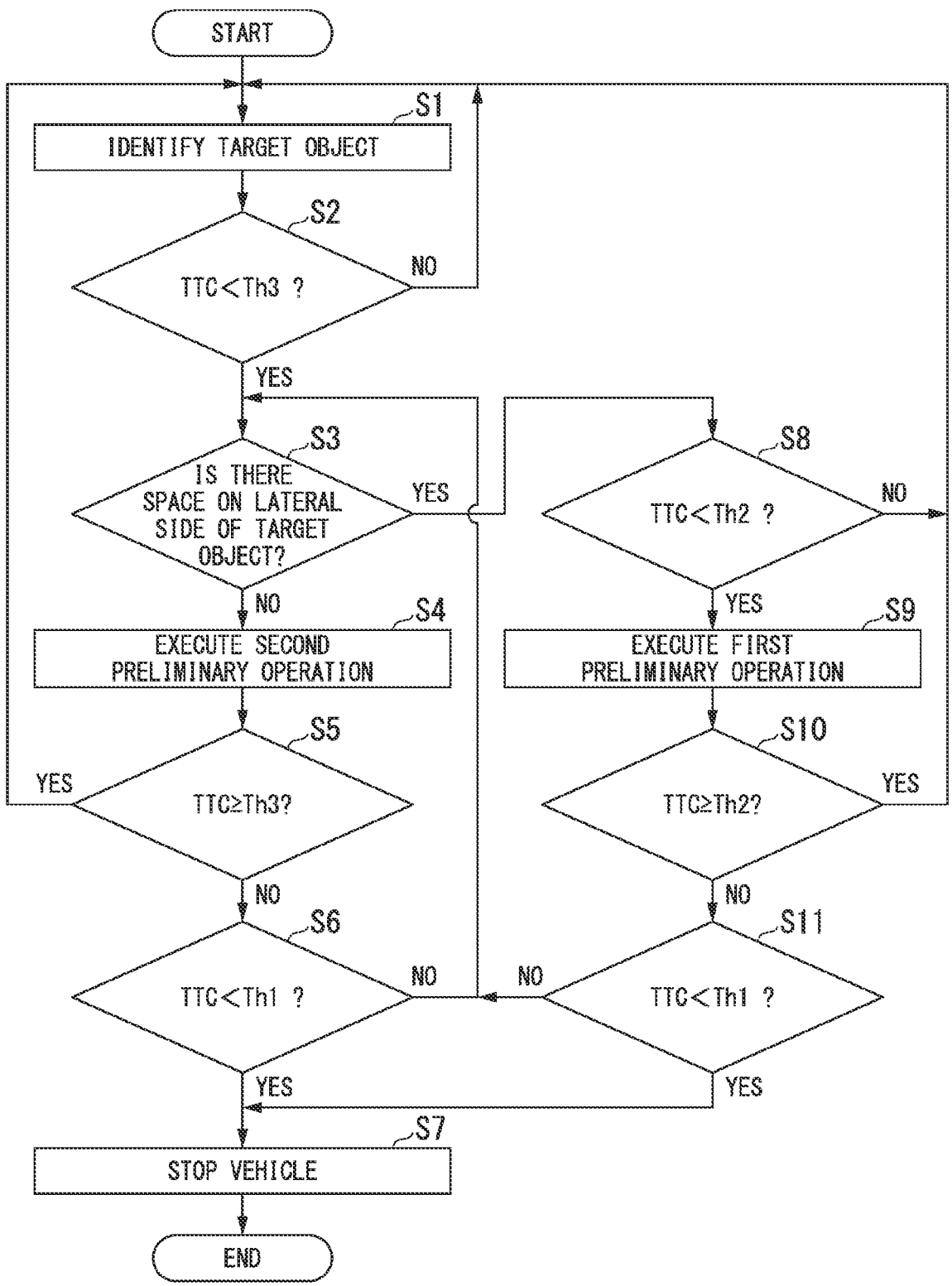
FIG. 7 is a flowchart showing an example of a flow of a process executed by the driving assistance device.

FIG. 7 is a flowchart showing an example of a flow of a process executed by the driving assistance device 100.

First, the braking controller 110 identifies a target object TO (step S1). Subsequently, the second preliminary operation controller 130 determines whether or not TTC between the vehicle M and the target object TO is less than the third threshold Th3 (step S2). When the TTC between the vehicle M and the target object TO is greater than or equal to the third threshold Th3, the process returns to step S1.

When it is determined that the TTC between the vehicle M and the target object TO is less than the third threshold Th3, the steering-based avoidance possibility determiner 132 of the second preliminary operation controller 130 determines whether or not there is a space where the vehicle M is able to travel in a travel path on a lateral side of the target object TO (step S3).

When it is determined that there is no space where the vehicle M is able to travel in a travel path on a lateral side of the target object TO, the second preliminary operation controller 130 executes the second preliminary operation (step S4). At this time, as described above, the second preliminary operation controller 130 changes the setting of the second preliminary operation to be executed in accordance with an indicator value indicating a degree of congestion of other vehicles in the travel path on the lateral side of the target object TO. Subsequently, the second preliminary operation controller 130 determines whether or not the TTC between the vehicle M and the target object TO has increased to a value greater than or equal to the third threshold Th3 (step S5). When it is determined that the TTC between the vehicle M and the target object TO has increased to a value greater than or equal to the third threshold Th3, the process returns to step S1.

When it is determined that the TTC between the vehicle M and the target object TO has not increased to a value greater than or equal to the third threshold Th3, the braking controller 110 determines whether or not the TTC between the vehicle M and the target object TO is less than the first threshold Th1 (step S6). When it is determined that the TTC between the vehicle M and the target object TO is greater than or equal to the first threshold Th1, the process returns to step S3. When an affirmative determination has been obtained in step S3, the second preliminary operation is stopped and the processing from step S8 is executed. When it is determined that the TTC between the vehicle M and the target object TO is less than the first threshold Th1, the braking controller 110 causes the vehicle M to decelerate and stop by causing the brake device 210 and/or the travel driving force output device 200 to output a braking force for decelerating the vehicle M at the first deceleration B1 (step S7). At this time, as described above, in place of (or in addition to) decelerating and stopping the vehicle M, steering-based avoidance may be performed.

When an affirmative determination has been obtained in step S3, i.e., when the TTC between the vehicle M and the target object TO is less than the third threshold Th3, and there is a space where the vehicle M is able to travel in the travel path on the lateral side of the target object TO, the first preliminary operation controller 112 of the braking controller 110 determines whether or not the TTC between the vehicle M and the target object TO is less than the second threshold Th2 (step S8). When it is determined that the TTC between the vehicle M and the target object TO is greater than or equal to the second threshold Th2, the process returns to step S1.

When it is determined that the TTC between the vehicle M and the target object TO is less than the second threshold Th2, the first preliminary operation controller 112 executes the first preliminary operation (step S9). Subsequently, the first preliminary operation controller 112 determines whether or not the TTC between the vehicle M and the target object TO has increased to a value greater than or equal to the second threshold Th2 (step S10). When it is determined that the TTC between the vehicle M and the target object TO has increased to a value greater than or equal to the second threshold Th2, the process returns to step S1.

When it is determined that the TTC between the vehicle M and the target object TO has not increased to a value greater than or equal to the second threshold Th2, the braking controller 110 determines whether or not the TTC between the vehicle M and the target object TO is less than the first threshold Th1 (step S11). When it is determined that the TTC between the vehicle M and the target object TO is greater than or equal to the first threshold Th1, the process returns to step S3. When a negative determination has been obtained in step S3, the first preliminary operation is stopped and the processing from step S4 is executed. When it is determined that the TTC between the vehicle M and the target object TO is less than the first threshold Th1, the braking controller 110 causes the brake device 210 and/or the travel driving force output device 200 to output the first deceleration B1 and causes the vehicle M to decelerate and stop (step S7).

In the above-described embodiment, when the branch road to the destination set in the navigation device 50 is located on the left or right side of the lane in which the vehicle M is traveling, the lane change may be forcedly made during the preliminary operation. Thus, consequently, it is possible to move the vehicle M in a direction closer to the destination and guide the vehicle M in a state in which the object serving as the target object is not near the vehicle M.

Although modes for carrying out the present invention have been described above using embodiments, the present invention is not limited to the embodiments and various modifications and substitutions can also be made without departing from the scope and spirit of the present invention.

What is claimed is:

1. A driving assistance device comprising:
   a storage medium storing computer-readable instructions; and
   at least one processor connected to the storage medium, the at least one processor executing the computer-readable instructions to:
     receive an output of a sensor that detects that an object is located in front of a vehicle;
     actuate a brake device of the vehicle, stopping the vehicle, and/or a steering device of the vehicle, avoiding a collision with the object by steering, when an indicator value that decreases as the vehicle approaches the object is less than a first threshold;
     execute a first preliminary operation when the indicator value is less than a second threshold;
     execute a second preliminary operation when the indicator value is less than a third threshold and it is determined that there is no travel path along which the vehicle is able to travel on both lateral sides of the object when the vehicle avoids the collision with the object by steering, wherein the first threshold is less than the second threshold and the second threshold is less than the third threshold; and
     change a setting of the second preliminary operation in accordance with whether or not a number of other vehicles located in a travel path on the lateral side of the object is greater than or equal to a first specific value and speeds of the other vehicles are less than or equal to a second specific value.

2. The driving assistance device according to claim 1, wherein the second preliminary operation is an operation that is started at an earlier timing than the first preliminary operation.

3. The driving assistance device according to claim 1, wherein the second preliminary operation is an operation performed in more steps than the first preliminary operation.

4. The driving assistance device according to claim 1, wherein at least one of the first preliminary operation and the second preliminary operation is an operation of actuating the brake device to output a braking force less than a braking force that the at least one processor actuates the brake device to output when an indicator value based on a distance between the object and the vehicle and a relative speed is less than the first threshold.

5. The driving assistance device according to claim 4, wherein both the first preliminary operation and the second preliminary operation are operations of actuating the brake device to output a braking force less than a braking force that the at least one processor actuates the brake device to output when an indicator value based on a distance between the object and the vehicle and a relative speed is less than the first threshold, and wherein a braking force initially output in the second preliminary operation is less than a braking force initially output in the first preliminary operation.

6. The driving assistance device according to claim 4, wherein the second preliminary operation is an operation of increasing the braking force to be output when the number of other vehicles located in the travel path on the lateral side of the object is greater than or equal to the first specific value and the speeds of the other vehicles are less than or equal to the second specific value.

7. The driving assistance device according to claim 1, wherein at least one of the first preliminary operation and the second preliminary operation is an operation of actuating an output device to perform a display process, a sound output process, or a vibration output process as an alert.

8. The driving assistance device according to claim 1, wherein the second preliminary operation is an operation of actuating an output device to perform a display process, a sound output process, or a vibration output process as an alert at an earlier timing when the number of other vehicles located in the travel path on the lateral side of the object is greater than or equal to the first specific value and the speeds of the other vehicles are less than or equal to the second specific value.

9. A driving assistance method comprising:
   receiving, by a driving assistance device, an output of a sensor that detects that an object is located in front of a vehicle;
   actuating, by the driving assistance device, a brake device of the vehicle, stopping the vehicle, and/or a steering device of the vehicle, avoiding a collision with the object by steering, when an indicator value that decreases as the vehicle approaches the object is less than a first threshold;
   executing, by the driving assistance device, a first preliminary operation when the indicator value is less than a second threshold;
   executing, by the driving assistance device, a second preliminary operation when the indicator value is less than a third threshold and it is determined that there is no travel path along which the vehicle is able to travel on both lateral sides of the object when the vehicle avoids the collision with the object by steering, wherein the first threshold is less than the second threshold and the second threshold is less than the third threshold; and
   changing, by the driving assistance device, a setting of the second preliminary operation in accordance with whether or not a number of other vehicles located in a travel path on the lateral side of the object is greater than or equal to a first specific value and speeds of the other vehicles are less than or equal to a second specific value.

10. A computer-readable non-transitory storage medium storing a program for causing a computer to:
receive an output of a sensor that detects that an object is located in front of a vehicle;
actuate a brake device of the vehicle, stopping the vehicle, and/or a steering device of the vehicle, avoiding a collision with the object by steering, when an indicator value that decreases as the vehicle approaches the object is less than a first threshold;
execute a first preliminary operation when the indicator value is less than a second threshold;
execute a second preliminary operation when the indicator value is less than a third threshold and it is determined that there is no travel path along which the vehicle is able to travel on both lateral sides of the object when the vehicle avoids the collision with the object by steering, wherein the first threshold is less than the second threshold and the second threshold is less than the third threshold; and
change a setting of the second preliminary operation in accordance with whether or not a number of other vehicles located in a travel path on the lateral side of the object is greater than or equal to a first specific value and speeds of the other vehicles are less than or equal to a second specific value.

\* \* \* \* \*